United States Patent
Kusagaya

(10) Patent No.: US 7,635,211 B2
(45) Date of Patent: Dec. 22, 2009

(54) AIMING DEVICE OF LIGHTING DEVICE FOR VEHICLE AND LIGHTING DEVICE FOR VEHICLE

(75) Inventor: Masahiro Kusagaya, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 250 days.

(21) Appl. No.: 11/873,491

(22) Filed: Oct. 17, 2007

(65) Prior Publication Data

US 2008/0106909 A1 May 8, 2008

(30) Foreign Application Priority Data

Nov. 8, 2006 (JP) ............... 2006-302672

(51) Int. Cl.
*F21V 19/02* (2006.01)
*F21V 21/14* (2006.01)

(52) U.S. Cl. ............... 362/526; 362/524; 362/530

(58) Field of Classification Search ............... 362/466, 362/507, 523, 524, 528–532, 526, 467, 285–287, 362/289, 418, 419, 421–426

See application file for complete search history.

(56) References Cited

U.S. PATENT DOCUMENTS 6,918,687 B2* 7/2005 Deguchi ............... 362/463
6,960,006 B2* 11/2005 Abe ............... 362/538
7,036,964 B2* 5/2006 Takii et al. ............... 362/465
7,175,319 B2* 2/2007 Tajima et al. ............... 362/465

FOREIGN PATENT DOCUMENTS

JP 2004-227933 8/2004
JP 2005-119463 5/2005

OTHER PUBLICATIONS

Patent Abstracts of Japan, Publication No. 2005-119463 dated May 12, 2005, 2 pages.
Patent Abstracts of Japan, Publication No. 2004-227933 dated Aug. 12, 2004, 2 pages.

* cited by examiner

*Primary Examiner*—Bao Q Truong
(74) *Attorney, Agent, or Firm*—Osha • Liang LLP

(57) ABSTRACT

An aiming device of a lighting device for a vehicle for transversely and vertically tilting a lamp unit supported tiltably in vertical and transverse directions on one fulcrum in a lamp housing formed by a lamp body having a concave portion which is opened almost forward and a transparent cover for covering a front opening of the lamp body includes a case, a slider provided movably in a longitudinal direction along a vertical aiming shaft supported on the case, an output shaft, which is rotatably supported on the slider and is coupled to the lamp unit, and a transverse aiming shaft supported on the slider in almost parallel with the vertical aiming shaft, coupled to the output shaft, and serving to rotate the output shaft by a rotation. The vertical aiming shaft is rotated so that the slider is moved in the longitudinal direction.

10 Claims, 7 Drawing Sheets

AIMING DEVICE OF LIGHTING DEVICE FOR VEHICLE AND LIGHTING DEVICE FOR VEHICLE

This application claims foreign priority from Japanese Patent Application No. 2006-302672 filed on Nov. 8, 2007, the entire contents of which are hereby incorporated by reference.

BACKGROUND OF THE INVENTION

1. Field of the Invention

The present invention relates to a novel aiming device of a lighting device for a vehicle and the lighting device for a vehicle. More specifically, the invention relates to a technique for decreasing the number of components, thereby reducing cost and size.

2. Related Art

In a lighting device for a vehicle, for example, a headlamp for a vehicle, it is necessary to regulate an irradiating direction transversely and vertically. This is required for precisely illuminating a forward part of a running path of a self-vehicle to maintain the safety of a running operation and for preventing an emission of a light, which becomes a dazzling light for a driver of a vehicle running on an opposite lane or a pedestrian.

In a lighting device for a vehicle described in each of Patent Documents 1 and 2, for example, a transversely and vertically tiltable bracket is disposed in a lamp housing formed by a lamp body and a transparent cover, and is caused to support a lamp unit for irradiating an illumination light. The bracket is tilted transversely and vertically, thereby tilting the lamp unit and regulating an irradiating direction.

[Patent Document 1] JP-A-2004-227933 Publication
[Patent Document 2] JP-A-2005-119463 Publication

SUMMARY OF THE INVENTION

In the conventional lighting device for a vehicle, the bracket is supported on the lamp body at three points. For this reason, there is a problem in that an assembly is hard to perform and productivity is poor.

In one or more embodiments of the present invention, an aiming device for a vehicle and a lighting device for a vehicle which can support a lamp unit at one point is provided.

One or more embodiments of invention provides an aiming device for a vehicle for transversely and vertically tilting a lamp unit supported tiltably in vertical and transverse directions on one fulcrum in a lamp housing formed by a lamp body having a concave portion which is opened almost forward and a transparent cover for covering a front opening of the lamp body, comprising a case, a slider movable in a longitudinal direction along a vertical aiming shaft supported on the case, an output shaft rotatably supported on the slider and coupled to the lamp unit, and a transverse aiming shaft supported on the slider in almost parallel with the vertical aiming shaft, coupled to the output shaft and serving to rotate the output shaft by a rotation, wherein the vertical aiming shaft is rotated so that the slider is moved in the longitudinal direction.

Moreover, one or more embodiments of the invention provides an aiming device for a lighting device for a vehicle wherein the lighting device supports one of an upper end and a lower end of a lamp unit, wherein the lamp unit comprises a light source and serves to forward irradiate light of the light source, wherein the lamp unit is disposed in the lamp housing, and wherein the other one of the upper end and the lower end of the lamp unit is coupled to the output shaft.

In one or more embodiments of the invention, accordingly, it is possible to support a lamp unit without a bracket, to decrease the number of components and to reduce the required man-hours for assembly.

One or more embodiments of invention provides an aiming device of a lighting device for a vehicle for transversely and vertically tilting a lamp unit supported tiltably in vertical and transverse directions on one fulcrum in a lamp housing formed by a lamp body having a concave portion which is opened almost forward and a transparent cover for covering a front opening of the lamp body, comprising a case, a slider provided movably in a longitudinal direction along a vertical aiming shaft supported on the case, an output shaft rotatably supported on the slider and coupled to the lamp unit, and a transverse aiming shaft supported on the slider in almost parallel with the vertical aiming shaft, coupled to the output shaft and serving to rotate the output shaft by a rotation, wherein the vertical aiming shaft is rotated so that the slider is moved in the longitudinal direction.

In the aiming device of a lighting device for a vehicle according to one or more embodiments of the invention, therefore, the support is carried out to be vertically and transversely tiltable on one fulcrum. Consequently, the number of components is decreased and the required man-hours for assembly is also reduced. Therefore, it is possible to considerably reduce cost.

According to a second aspect of one or more embodiments of the invention, the output shaft is provided in a position between the vertical aiming shaft and the transverse aiming shaft. Therefore, size can be reduced and a stable operation can be maintained with an excellent weight balance.

According to a third aspect of one or more embodiments of the invention, there is provided a transverse aiming regulating member to be moved in a longitudinal direction along the transverse aiming shaft corresponding to the rotation of the transverse aiming shaft, and a tip portion of an arm piece extended from the output shaft is engaged with the transverse aiming regulating member in a rotatable state and the movement in the longitudinal direction of the transverse aiming regulating member is caused by a rotating motion of the output shaft through the arm piece. Therefore, the transverse aiming shaft is not moved longitudinally, but the output shaft can be rotated by the rotating operation. Consequently, a space for moving the transverse aiming shaft in the longitudinal direction is not required so that size can be reduced.

According to a fourth aspect of one or more embodiments of the invention, a wheel gear to be mated with a worm gear formed on the transverse aiming shaft is formed integrally with the output shaft, and the output shaft is rotated by the rotation of the transverse aiming shaft. Therefore, it is possible to decrease the number of components and to absorb a deviation caused by the rotation of the output shaft.

One or more embodiments of invention provides an aiming device for a lighting device for a vehicle wherein the lighting device supports one of an upper end and a lower end of a lamp unit, wherein the lamp unit comprises a light source and serves to forward irradiate light of the light source, wherein the lamp unit is disposed in the lamp housing, and wherein the other one of the upper end and the lower end of the lamp unit is coupled to the output shaft.

In the lighting device for a vehicle according to one or more embodiments of the invention, therefore, it is possible to achieve a reduction in cost and size by a decrease in the number of components, and furthermore, to carry out aiming in vertical and transverse directions in the same direction and the same place.

DETAILED DESCRIPTION OF THE EXEMPLARY EMBODIMENTS

Figure 1:
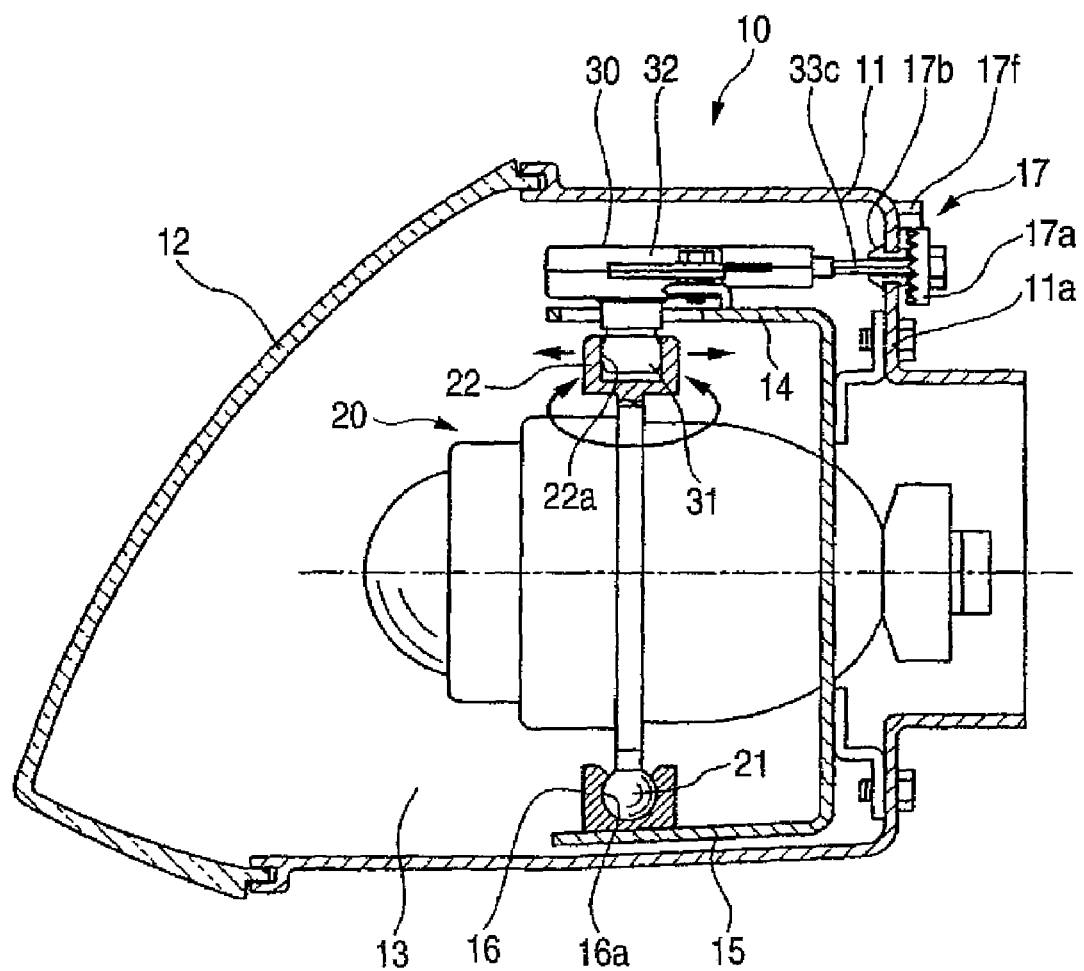
FIG. 1 is a schematic longitudinal sectional view showing an embodiment of the invention applied to a headlamp for a vehicle and an aiming device of the headlamp for a vehicle, illustrating the headlamp for a vehicle.

The best mode for executing an aiming device of a lighting device for a vehicle and the lighting device for a vehicle according to the invention will be described below with reference to the accompanying drawings. In the embodiments shown in the drawings, embodiments of the invention are applied to a headlamp for a vehicle and an aiming device of the headlamp for a vehicle.

A headlamp 10 for a vehicle has such a structure that a lamp unit 20 is disposed in a lamp housing 13 formed by covering a front opening of a lamp body 11 having a concave portion opened on a front surface with a transparent cover 12.

The lamp body 11 is provided with an upper attaching piece 14 and a lower attaching piece 15 in an almost vertical opposing state, an actuator 30 to be an aiming device of a lighting device for a vehicle is fixed into the upper attaching piece 14, a ball receiving member 16 is fixed to the lower attaching piece 15, and a spherical concave portion 16a opened to an upper surface is formed on the ball receiving member 16.

The lamp unit 20 has a well-known structure and is constituted to forward irradiate a beam in a predetermined light distribution pattern. A sphere 21 is protruded from a lower surface of the lamp unit 20 and is fitted into the spherical concave portion 16a of the ball receiving member 16, and a fulcrum portion taking a shape of a ball joint is formed by the sphere 21 and the ball receiving member 16. Accordingly, the lamp unit 20 can be tilted transversely and vertically by a rotation of the sphere 21 in the spherical concave portion 16a of the ball receiving member 16. A joint member 22 is protruded from an upper surface of the lamp unit 20, and a coupling concave portion 22a opened to an upper surface is formed on the joint member 22. An output shaft 31 of the actuator 30 is pushed into the coupling concave portion 22a. The output shaft 31 of the actuator 30 is rotatable with respect to a case 32 and is movable in a longitudinal direction. When the output shaft 31 is rotated, the joint member 22 to which the output shaft 31 is coupled receives a rotating force of the output shaft 31 so that the lamp unit 20 having the joint member 22 formed therein is rotated in a transverse direction. When the output shaft 31 is moved in the longitudinal direction, moreover, the joint member 22 is moved longitudinally in a state in which the sphere 21 is fixed in the longitudinal direction. Therefore, the lamp unit 20 is tilted in a vertical direction. Thus, the lamp unit 20 is tilted in the transverse and vertical directions.

Figure 3:
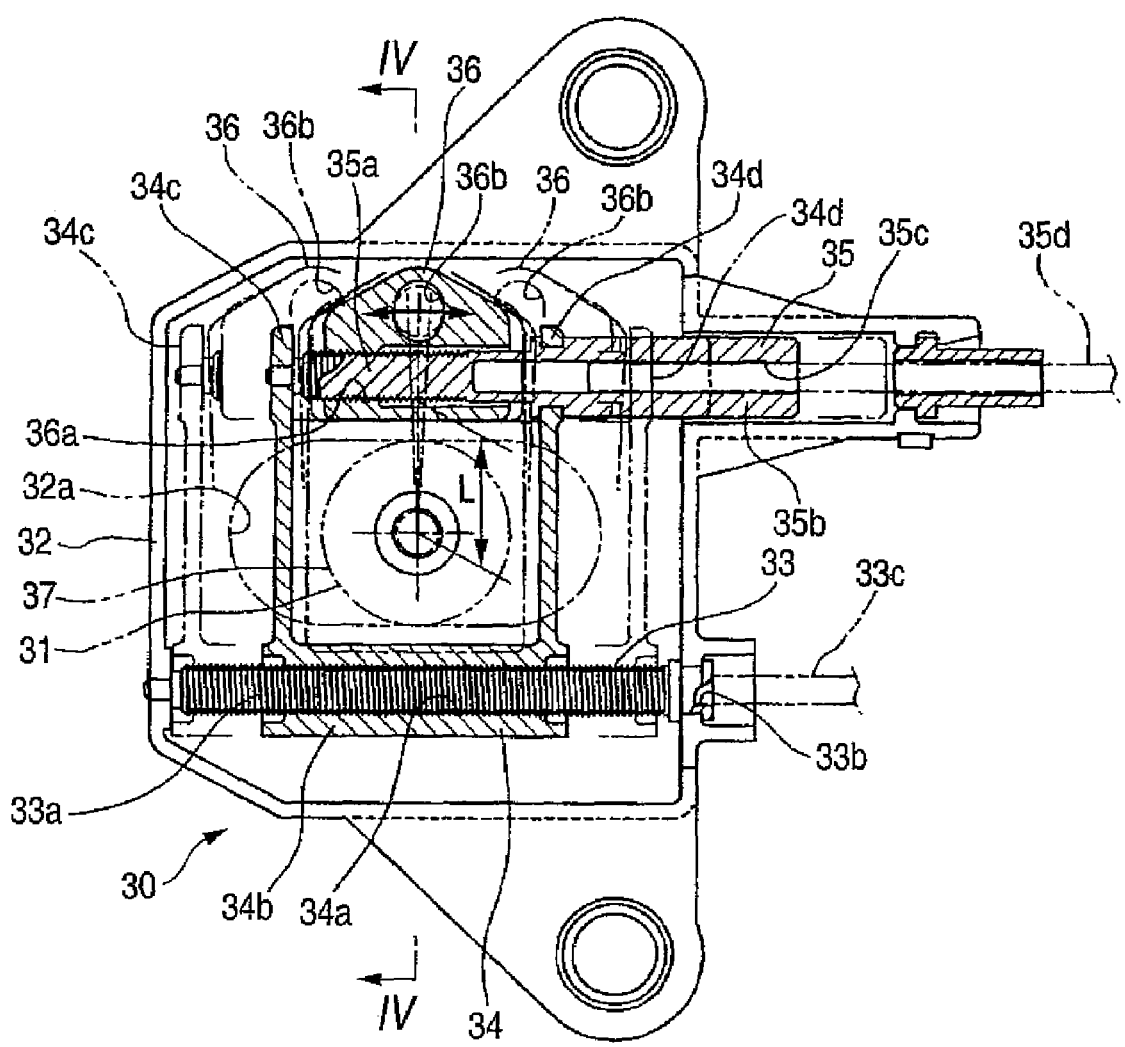
FIG. 3 is a bottom view showing an actuator together with FIGS. 4 and 5, a part of which is taken away.
Figure 4:
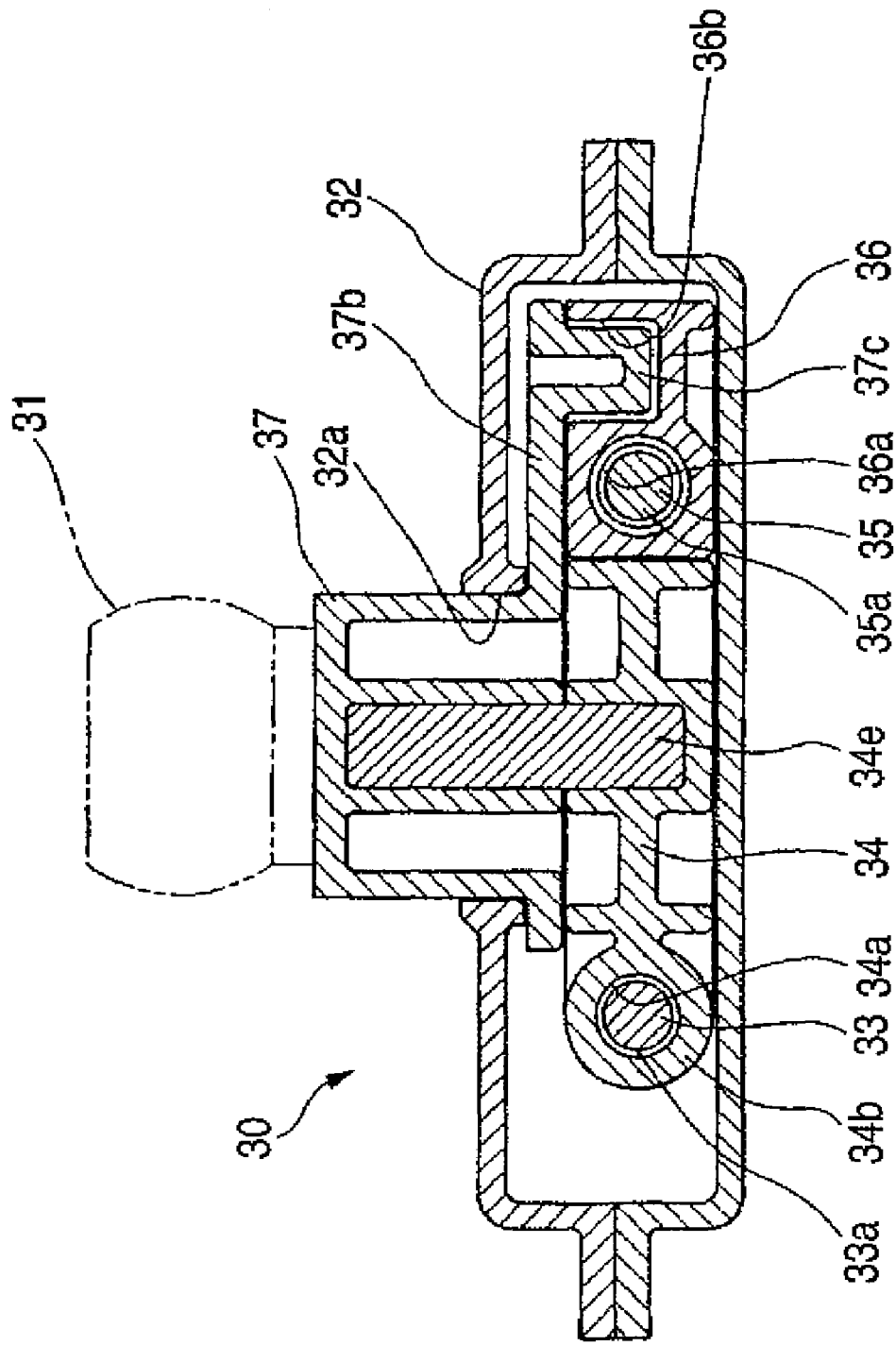
FIG. 4 is a sectional view taken along a IV-IV line in FIG. 3.
Figure 5:
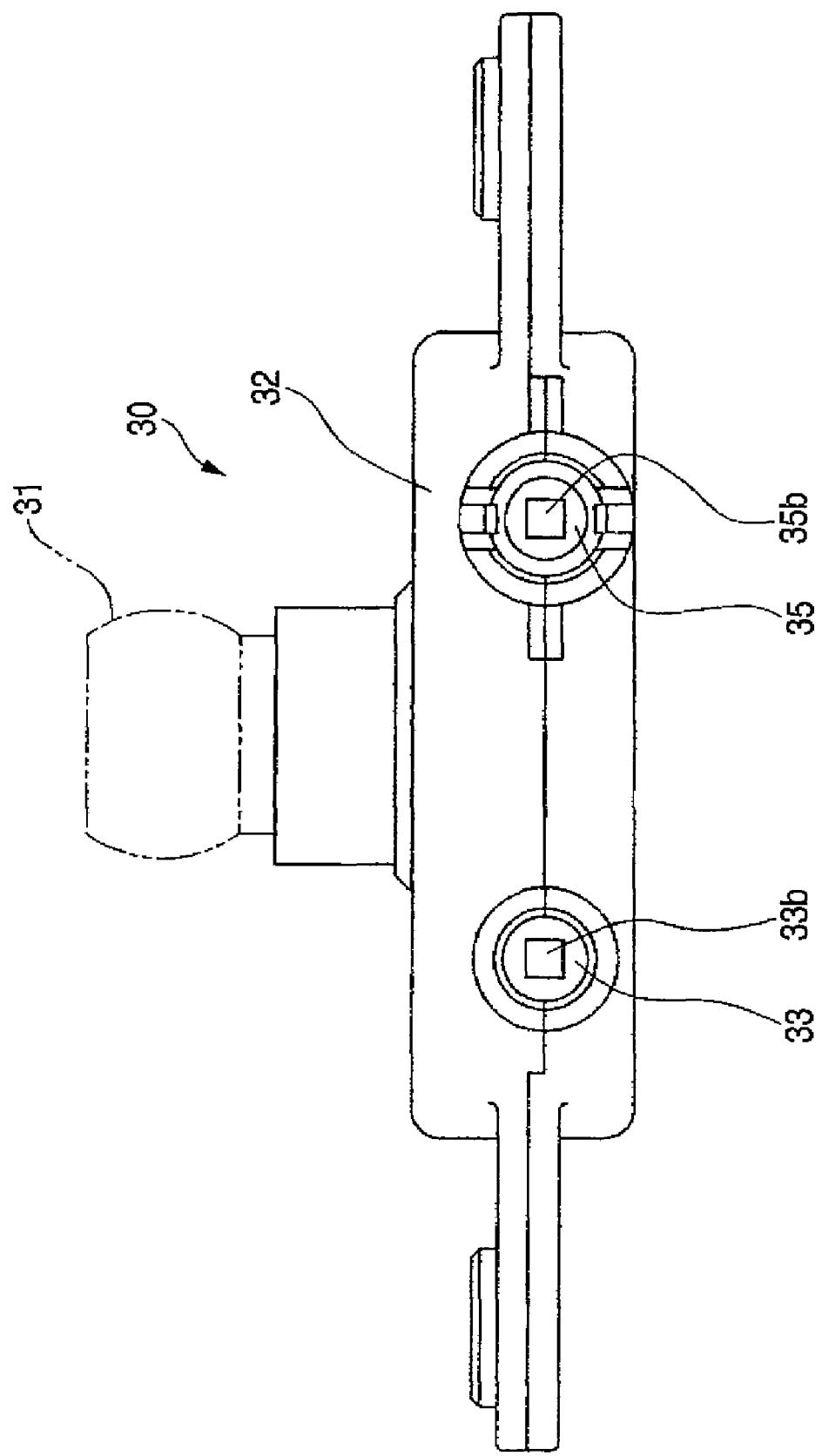
FIG. 5 is a back view.

Next, the details of the actuator 30 will be described with reference to FIGS. 3 to 5.

A vertical aiming shaft 33 is rotatably supported in an extension state in a longitudinal direction in a close position to one of sides in a transverse direction in the case 32 of the actuator 30. The vertical aiming shaft 33 has a screw bar 33a formed on an outer peripheral surface thereof, and a coupling hole 33b opened to a rear end is formed in a close portion to a rear end of a central part. The coupling hole 33b is formed to take a non-circular cross section, for example, a rectangular cross section.

A slider 34 is supported on the vertical aiming shaft 33 so as to be movable in the longitudinal direction. The slider 34 is provided with a screw hole 34a extended in the longitudinal direction and a portion having the screw bar 33a of the vertical aiming shaft 33 formed thereon is screwed into the screw hole 34a. When the vertical aiming shaft 33 is rotated, accordingly, the screw bar 33a feeds a screw groove of the screw hole 34a of the slider 34. Consequently, the slider 34 is moved forward or rearward depending on a direction of the rotation of the vertical aiming shaft 33.

Support arms 34c and 34d are protruded from both front and rear ends of a side portion 34b of the slider 34 on which the screw hole 34a is formed toward the other side portion. A transverse aiming shaft 35 is rotatably supported between tip portions of the support arms 34c and 34d, that is, between ends on an opposite side to the side portion 34b. In the transverse aiming shaft 35, a screw shaft portion 35a positioned between the two support arms 34c and 34d and a coupling portion 35b protruded rearward from the support arm 34d on a rear side are formed integrally with each other. A screw bar is formed on an outer peripheral surface of the screw shaft portion 35a, and a coupling hole 35c opened to a rear end is formed on the coupling portion 35b. The coupling hole 35c has a non-circular cross-section, for example, a rectangular cross-section.

A transverse aiming regulating member 36 to be moved in the longitudinal direction by the rotation of the transverse aiming shaft 35 is provided between the tip portions of the support arms 34c and 34d. The transverse aiming regulating member 36 has a screw hole 36a extended in the longitudinal direction and the screw shaft portion 35a of the transverse aiming shaft 35 is screwed into the screw hole 36a. When the transverse aiming shaft 35 is rotated, accordingly, the screw hole 36a of the transverse aiming regulating member 36 is fed forward or rearward by the screw shaft portion 35a. Therefore, the transverse aiming regulating member 36 is moved forward or rearward along the screw shaft portion 35a of the transverse aiming shaft 35. The aiming regulating member 36 is provided with a coupling hole 36b extended in an orthogonal direction to a direction of an array of the two aiming shafts 33 and 35 and the longitudinal direction.

An output member 37 is supported on the slider 34. In the output member 37, the output shaft 31 taking an almost cylindrical shape and an arm piece 37b protruded in an orthogonal direction to an axial direction of the output shaft 31 from an outer peripheral surface of the output shaft 31 are formed integrally with each other. An engaging pin 37c protruded in the same direction as an axial direction of the output shaft 31 is provided on a tip portion of the arm piece 37b. The output shaft 31 is rotatably supported on a support shaft 34e protruded from the slider 34, and, furthermore, the engaging pin 37c is fitted in the coupling hole 36b of the transverse aiming regulating member 36 in a rotatable state.

An inserting hole 32a, which is long in a longitudinal direction, is formed on a lower surface of the case 32, and the output shaft 31 is inserted through the inserting hole 32a of the case 32 and is protruded downward. The actuator 30 is attached to the upper attaching piece 14 of the lamp body 11, and the output shaft 31 of the actuator 30 is pushed into the coupling concave portion 22a formed on the joint member 22 of the lamp unit 20.

Flexible wires 33c and 35d are coupled to the vertical aiming shaft 33 and the transverse aiming shaft 35, respectively. The vertical aiming shaft 33 and the transverse aiming shaft 35 are rotated separately through the flexible wires 33c and 35d. A tip portion of the flexible wire 33c takes an almost rectangular cross-section, and a tip portion of the rectangle is fitted in the coupling hole 33b of the vertical aiming shaft 33. When the flexible wire 33c is rotated by an operation performed externally, the vertical aiming shaft 33 is rotated so that the slider 34 is moved longitudinally. Accordingly, the output member 37 supported on the slider 34 is moved in the longitudinal direction. When the output member 37 is moved longitudinally, the joint member 22 fitted in the output shaft 31 is moved longitudinally. Consequently, the lamp unit 20 is vertically tilted by setting the sphere 21 on the lower end as a rotating fulcrum portion and the irradiating direction is changed in the vertical direction. Moreover, a tip portion of the flexible wire 35d has an almost rectangular cross-section, and a tip portion of the rectangle is fitted in the coupling hole 35c of the transverse aiming shaft 35 in a slidable state in the longitudinal direction. When the flexible wire 35d is rotated by an operation performed externally, the transverse aiming shaft 35 is rotated. When the transverse aiming shaft 35 is rotated, the transverse aiming regulating member 36 is fed by the screw shaft portion 35a and is moved longitudinally. Therefore, the engaging pin 37c of the output member 37 fitted in the coupling hole 36b of the transverse aiming member 36 is moved almost longitudinally. When the engaging pin 37c is moved longitudinally, the position in the longitudinal direction of the output shaft 31 is not changed. Therefore, the output shaft 31 is rotated corresponding to the movement of the engaging pin 37c. When the output shaft 31 is rotated, the lamp unit 20 receives a rotating force through the joint member 22 in which the output shaft 31 is fitted. Consequently, the lamp unit 20 is tilted transversely by setting the sphere 21 on the lower end as a rotating fulcrum so that the irradiating direction is changed in the transverse direction.

With the rotation of the output shaft 31, the engaging pin 37c is moved by drawing a circular arc. More specifically, the engaging pin 37c is biased in an orthogonal direction to a direction of the movement of the transverse aiming regulating member 36. Therefore, it is preferable that the coupling hole 36b of the transverse aiming regulating member 36 with which the engaging pin 37c is engaged should be a slot that is slightly long in a direction of an array of the output shaft 31 and the transverse aiming regulating member 36.

Aiming operating portions 17 and 18 are provided in an upper part of a back face of the lamp body 11. The flexible shafts 33c and 35d are rotated by means of the aiming operating portions 17 and 18. Because the two aiming operating portions 17 and 18 have the same structures, one of them will be described and description of the other will be omitted by indicating the reference numerals representing identical portions in parentheses in the description of one of them.

Figure 2:
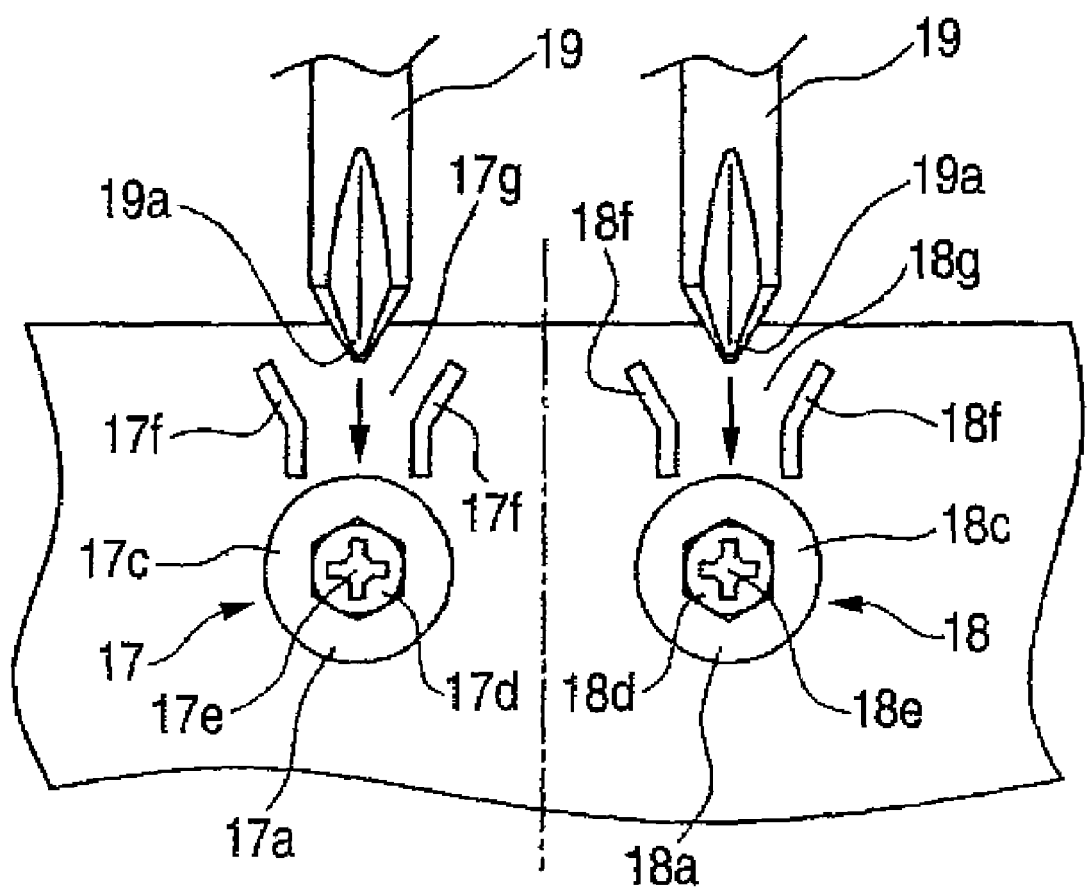
FIG. 2 is a view showing a part of a back face of the headlamp for a vehicle.

As is apparent from FIGS. 2 and 1, the aiming operating portion 17 (18) has an aiming gear 17a (18a), which is rotatably supported on a rear surface wall 11a of the lamp body 11.

The aiming gear 17a is constituted by integrally forming a shaft portion 17b supported on the rear surface wall 11a, a crown gear portion 17c (18c) provided behind the shaft portion 17b, and a head portion 17d (18d) provided behind the crown gear portion 17c (18c). The head portion 17d (18d) takes a hexagonal external shape, and can be rotated by means of a box driver, for example. Moreover, a cross groove 17e (18e) is formed on a rear surface of the head portion 17d (18d) and can also be rotated by means of a plus driver. A guide path 17g (18g) is formed by two guide walls 17f and 17f (18f and 18f) in a position placed just above a portion of a back face of the rear surface wall 11a of the lamp body 11 in which the aiming gear 17a (18a) is supported. When a tip portion 19a of a plus driver 19 is inserted into the guide path 17g (18g) from above, the tip portion 19a is mated with the crown gear portion 17c (18c). A rear end of the flexible wire 33c is fitted and fixed into the shaft portion 17b of the aiming gear 17a, and, furthermore, a rear end of the flexible wire 35d is fitted and fixed into a shaft portion (not shown) of the crown gear portion 18a.

Accordingly, when the crown gear portion 17c is rotated in the aiming operating portion 17 by means of the tip portion 19a of the plus driver 19, for example, the flexible wire 33c is rotated and the vertical aiming shaft 33 is rotated by the flexible wire 33c so that the lamp unit 20 is tilted in the vertical direction. Moreover, when the crown gear portion 18c is rotated in the aiming operating portion 18 by means of the tip portion 19a of the plus driver 19, for example, the flexible wire 35d is rotated and the transverse aiming shaft 35 is rotated by the flexible wire 35d so that the lamp unit 20 is tilted in the transverse direction.

Figure 6:
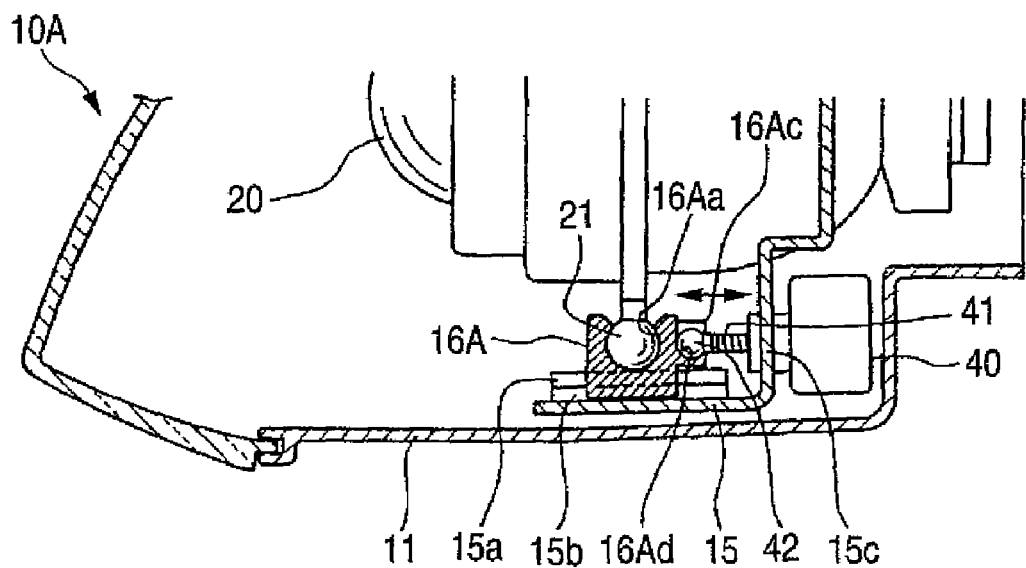
FIG. 6 is a schematic longitudinal sectional view showing a variant of the headlamp for a vehicle together with FIG. 7, illustrating a main part.
Figure 7:
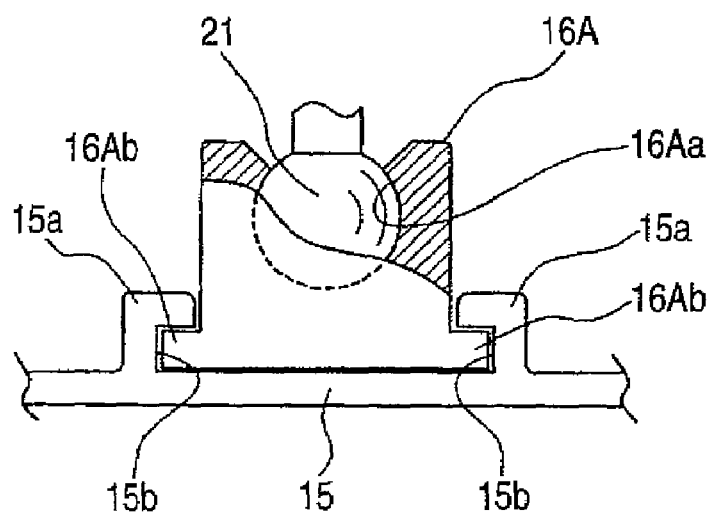
FIG. 7 is a front view showing the main part.

FIGS. 6 and 7 show a variant of the lighting device for a vehicle.

A headlamp 10A for a vehicle according to the variant is different from the headlamp 10 for a vehicle in that a lower end of a lamp unit 20 is moved longitudinally during running and an irradiating direction can be thus changed in a vertical direction, and is the same as the headlamp 10 for a vehicle in the other respects. Therefore, only the difference will be described in detail.

A ball receiving member 16A is provided on an upper surface of a lower attaching piece 15 disposed in a lamp body 11 movably in a longitudinal direction. More specifically, as shown in FIG. 7, rails 15a and 15a extended in the longitudinal direction are protruded from the upper surface of the lower attaching piece 15 in parallel with each other, and slide grooves 15b and 15b are formed on surfaces of the rails 15a and 15a which are opposed to each other. The ball receiving member 16A is provided with engaging wing pieces 16Ab and 16Ab protruded transversely, and the engaging wing pieces 16Ab and 16Ab are slidably engaged with the slide grooves 15b and 15b of the rails 15a and 15a. Consequently, the ball receiving member 16A is supported on the lower attaching piece 15 movably in the longitudinal direction. Moreover, the ball receiving member 16A has a coupling portion 16Ac protruded from a rear surface, and a spherical concave portion 16Ad opened to the rear surface is formed on the coupling portion 16Ac. A sphere 21 of the lamp unit 20 is rotatably fitted in a spherical concave portion 16Aa opened to an upper surface of the ball receiving member 16A. Accordingly, a lower end of the lamp unit 20 is supported on the lower attaching piece 15 of the lamp body 11 movably in the longitudinal direction.

The ball receiving member 16A is moved in the longitudinal direction by means of a leveling actuator 40. The leveling actuator 40 includes an operating shaft 41 to be moved in the longitudinal direction by a remote control, for example, a manual operation carried out at a driver's seat or an automatic operation carried out when detecting a tilt of a vehicle body through a sensor for detecting a height of an axle in front and rear parts, and a sphere 42 is formed on a front end of the operating shaft 41. The leveling actuator 40 is fixed to a support portion 15c raised upward from a rear end of the lower attaching piece 15, and the sphere 42 on the front end of the operating shaft 41 is fitted in the spherical concave portion 16Ad of the ball receiving member 16A in a rotatable state. When the leveling actuator 40 is driven so that the operating shaft 41 is moved in the longitudinal direction, accordingly, the ball receiving member 16A is moved in the longitudinal direction. Consequently, the lamp unit 20 is tilted in the vertical direction by setting, as a rotating fulcrum, a joint member 22 coupled to the output portion of an actuator 30.

Figure 8:
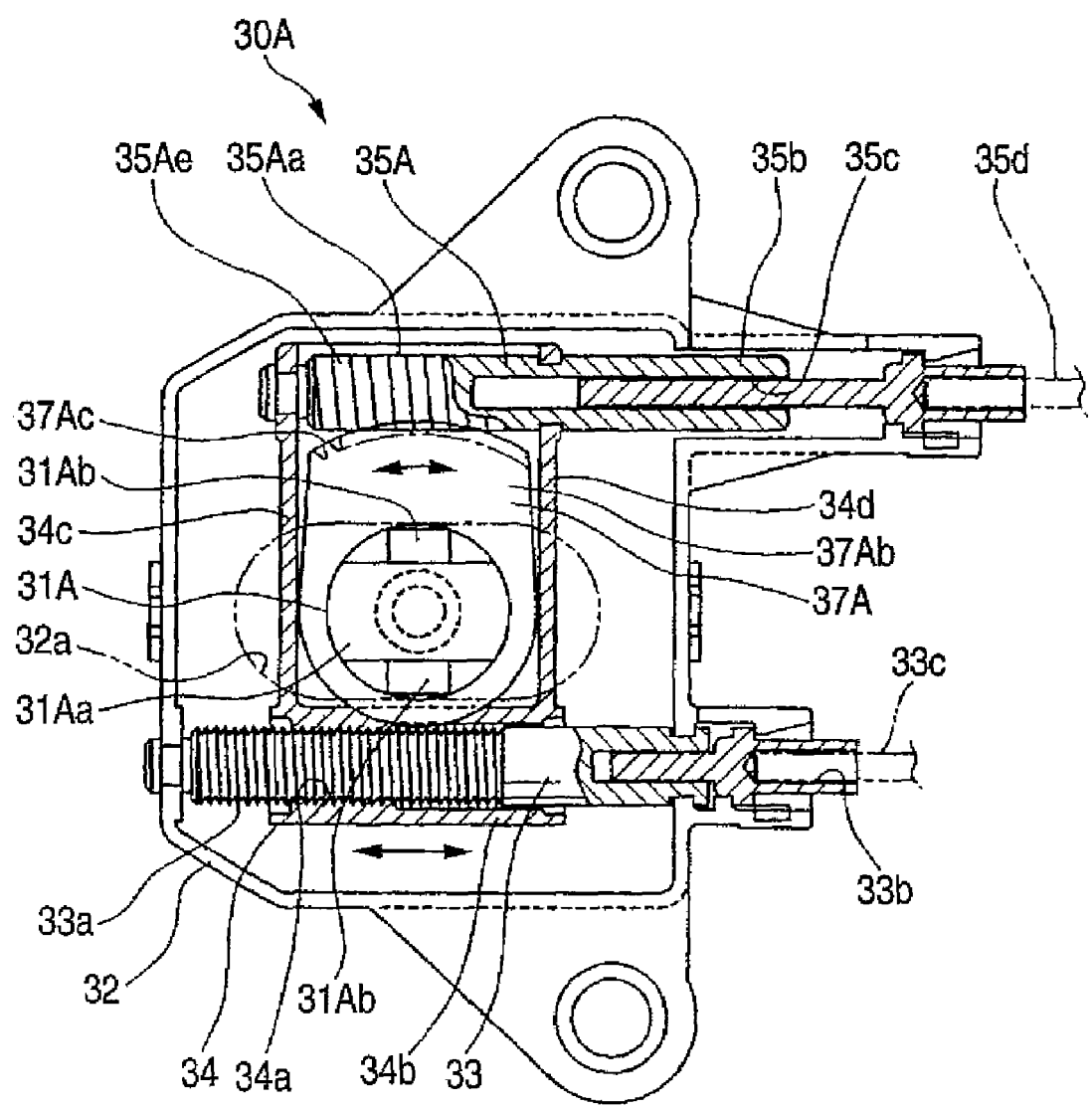
FIG. 8 is a bottom view showing a variant of the actuator, a part of which is taken away.

FIG. 8 shows a variant of the actuator.

An actuator 30A according to the variant has a different linking way between a transverse aiming shaft and an output shaft and has the same structure as that of the actuator 30 in the other respects. Accordingly, the different portion will be described in detail, and the other portions have the same reference numerals as those in the actuator 30 and description will be omitted.

In the actuator 30A, a transverse aiming regulating member is not provided between a transverse aiming shaft 35A and an output member 37A.

The output member 37A is constituted by integrally forming an output shaft 31A and an arm piece 37Ab protruded from an outer peripheral portion of the output shaft 31A, and an end face of the arm piece 37Ab which is distant from the output shaft 31A is formed to take a shape of a circular arc around a shaft center of the output shaft 31A and a bevel gear tooth is formed on the end face taking the shape of the circular arc and is set to be a wheel gear 37Ac. A gear tooth is formed on an outer peripheral surface of an almost half of a tip side of a portion 35Aa in the transverse aiming shaft 35A which is provided between support arms 34c and 34d of a slider 34 and is set to be a worm gear 35Ae. The worm gear 35Ae is mated with the wheel gear 37Ac of the output member 37A. When the transverse aiming shaft 35A is rotated through a flexible wire 35d, accordingly, the wheel gear 37Ac of the output member 37A is rotated by the worm gear 35Ae. Consequently, the output shaft 31A is rotated.

The output shaft 31A is constituted by integrally forming a first engaging portion 31Aa extended in a longitudinal direction and second engaging portions 31Ab and 31Ab protruded from both side surfaces of the first engaging portion 31Aa. Accordingly, a coupling concave portion of a joint member in which the output shaft 31A is fitted also has an engaging concave portion with which the first engaging portion 31Aa and the second engaging portions 31Ab and 31Ab are engaged separately.

While description has been made in connection with exemplary embodiments of the present invention, it will be obvious to those skilled in the art that various changes and modification maybe made therein without departing from the present invention. It is aimed, therefore, to cover in the appended claims all such changes and modifications falling within the true spirit and scope of the present invention.

DESCRIPTION OF THE REFERENCE NUMERALS AND SIGNS

10 . . . headlamp for vehicle (lighting device for vehicle), 11 . . . lamp body, 12 . . . transparent cover, 13 . . . lamp housing, 20 . . . lampunit, 30 . . . actuator (aiming device of lighting device for vehicle), 31 . . . output shaft, 32 . . . case, 33 . . . vertical aiming shaft, 34 . . . slider, 35 . . . transparent aiming shaft, 36 . . . transverse aiming regulating member, 37b . . . arm piece, 10A . . . headlamp for vehicle (lighting device for vehicle), 30A . . . actuator (aiming device of lighting device for vehicle), 31A . . . output shaft, 32 . . . case, 33 . . . vertical aiming shaft, 34 . . . slider, 35A . . . transverse aiming shaft, 35Ae . . . worm gear, 37Ab . . . arm piece, 37Ac . . . wheel gear.

What is claimed is:

1. An aiming device of a lighting device for a vehicle for transversely and vertically tilting a lamp unit supported tiltably in vertical and transverse directions on one fulcrum in a lamp housing formed by a lamp body having a concave portion which is opened almost forward and a transparent cover for covering a front opening of the lamp body, comprising:
    a case;
    a slider movable in a longitudinal direction along a vertical aiming shaft supported on the case;
    an output shaft rotatably supported on the slider and coupled to the lamp unit; and
    a transverse aiming shaft supported on the slider in almost parallel with the vertical aiming shaft, coupled to the output shaft, and serving to rotate the output shaft by a rotation,
    wherein the vertical aiming shaft is rotated so that the slider is moved in the longitudinal direction.

2. The aiming device of a lighting device for a vehicle according to claim 1, wherein the output shaft is provided in a position between the vertical aiming shaft and the transverse aiming shaft.

3. The aiming device of a lighting device for a vehicle according to claim 1 further comprising:
    a transverse aiming regulating member movable in a longitudinal direction along the transverse aiming shaft corresponding to the rotation of the transverse aiming shaft, and
    a tip portion of an arm piece extended from the output shaft, wherein the tip portion is engaged with the transverse aiming regulating member in a rotatable state, and
    wherein the movement in the longitudinal direction of the transverse aiming regulating member is caused by a rotating motion of the output shaft through the arm piece.

4. The aiming device of a lighting device for a vehicle according to claim 1 further comprising a wheel gear to be mated with a worm gear formed on the transverse aiming shaft,
    wherein the wheel gear is formed integrally with the output shaft, and
    wherein the output shaft is rotated by the rotation of the transverse aiming shaft.

5. The aiming device of a lighting device for a vehicle according to claim 1,
    wherein the lighting device serves to support one of an upper end and a lower end of the lamp unit,
    wherein the lamp unit comprises a light source and serves to forward irradiate a light of the light source,
    wherein the aiming device is disposed in the lamp housing, and
    wherein the other one of the upper end and the lower end of the lamp unit is coupled to the output shaft.

6. The aiming device of a lighting device for a vehicle according to claim 2 further comprising:
    a transverse aiming regulating member movable in a longitudinal direction along the transverse aiming shaft corresponding to the rotation of the transverse aiming shaft, and a tip portion of an arm piece extended from the output shaft, wherein the tip portion is engaged with the transverse aiming regulating member in a rotatable state, and wherein the movement in the longitudinal direction of the transverse aiming regulating member is caused by a rotating motion of the output shaft through the arm piece.

7. The aiming device of a lighting device for a vehicle according to claim 2 further comprising a wheel gear to be mated with a worm gear formed on the transverse aiming shaft, wherein the wheel gear is formed integrally with the output shaft, and wherein the output shaft is rotated by the rotation of the transverse aiming shaft.

8. The aiming device of a lighting device for a vehicle according to claim 2, wherein the lighting device serves to support one of an upper end and a lower end of the lamp unit, wherein the lamp unit comprises a light source and serves to forward irradiate a light of the light source, wherein the aiming device is disposed in the lamp housing, and wherein the other one of the upper end and the lower end of the lamp unit is coupled to the output shaft.

9. The aiming device of a lighting device for a vehicle according to claim 3, wherein the lighting device serves to support one of an upper end and a lower end of the lamp unit, wherein the lamp unit comprises a light source and serves to forward irradiate a light of the light source, wherein the aiming device is disposed in the lamp housing, and wherein the other one of the upper end and the lower end of the lamp unit is coupled to the output shaft.

10. The aiming device of a lighting device for a vehicle according to claim 4, wherein the lighting device serves to support one of an upper end and a lower end of the lamp unit, wherein the lamp unit comprises a light source and serves to forward irradiate a light of the light source, wherein the aiming device is disposed in the lamp housing, and wherein the other one of the upper end and the lower end of the lamp unit is coupled to the output shaft.

* * * * *